United States Patent
Ishiguro et al.

(10) Patent No.: US 9,683,134 B2
(45) Date of Patent: Jun. 20, 2017

(54) PRESSURE-SENSITIVE ADHESIVE COMPOSITION AND PRESSURE-SENSITIVE ADHESIVE SHEET

(71) Applicant: Nitto Denko Corporation, Ibaraki-shi, Osaka (JP)

(72) Inventors: Shigeki Ishiguro, Ibaraki (JP); Satomi Yoshie, Ibaraki (JP); Hiroki Senda, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 158 days.

(21) Appl. No.: 14/385,210

(22) PCT Filed: Mar. 7, 2013

(86) PCT No.: PCT/JP2013/056326
§ 371 (c)(1),
(2) Date: Sep. 15, 2014

(87) PCT Pub. No.: WO2013/137110
PCT Pub. Date: Sep. 19, 2013

(65) Prior Publication Data
US 2015/0056446 A1 Feb. 26, 2015

(30) Foreign Application Priority Data

Mar. 16, 2012 (JP) .................. 2012-060669
Mar. 5, 2013 (JP) .................. 2013-043224

(51) Int. Cl.
*C09J 167/02* (2006.01)
*C09J 7/02* (2006.01)

(52) U.S. Cl.
CPC ........... *C09J 7/0207* (2013.01); *C09J 167/02* (2013.01); *C09J 2467/00* (2013.01); *Y10T 428/2852* (2015.01)

(58) Field of Classification Search
None
See application file for complete search history.

(56) References Cited

U.S. PATENT DOCUMENTS

| 4,668,763 A * | 5/1987 | Müller | C08G 18/4291 522/104 |
| 2002/0120093 A1* | 8/2002 | Amano | C08G 18/44 528/272 |
| 2005/0250914 A1 | 11/2005 | Stumbe et al. | |
| 2005/0256251 A1 | 11/2005 | Amano et al. | |
| 2012/0202058 A1 | 8/2012 | Takahira et al. | |
| 2013/0327396 A1* | 12/2013 | Akaike | B32B 7/12 136/256 |

FOREIGN PATENT DOCUMENTS

| JP | 6-128539 A | 5/1994 |
| JP | 2005-325255 A | 11/2005 |
| JP | 2005-536608 A | 12/2005 |
| JP | 2007-327012 A | 12/2007 |
| JP | 2008-13593 A | 1/2008 |
| JP | 2008-63527 A | 3/2008 |
| JP | 2010-168541 A | 8/2010 |
| JP | 2010-248489 A | 11/2010 |
| JP | 2011-37914 A | 2/2011 |
| WO | 2010/064612 A1 | 6/2010 |
| WO | 2011/049111 A1 | 4/2011 |

OTHER PUBLICATIONS

Daicel, PLACCEL CD220PL datasheet, available at http://www.daicel.com/yuuki/en/product/index.php?act=detail&page=1&id=194.*
PCT/IB/338 with attached International Preliminary Report on Patentability and Written Opinion, received in counterpart PCT/JP2013/056326.
Extended Search Report issued in corresponding EP Application No. 13760300.7 dated Oct. 28, 2015.
International Search Report for PCT/JP2013/056326 dated Jun. 11, 2013.
Chinese Search Report issued in corresponding Chinese Patent Application No. 20138000922.57 dated Jul. 1, 2015.

* cited by examiner

*Primary Examiner* — Scott R Walshon
(74) *Attorney, Agent, or Firm* — Sughrue Mion, PLLC

(57) ABSTRACT

A polyester-based pressure-sensitive adhesive composition comprises a polyester obtained by condensation polymerization of at least a dicarboxylic acid having a side chain and a diol, a polyether polyol, and a crosslinking agent, wherein the polyester has a weight average molecular weight of 5000 to 50000, the polyether polyol contains a polyether polyol having hydroxyl groups at only part of terminals and/or all terminals, the polyether polyol having hydroxyl groups at only part of terminals has a number average molecular weight of 100 to 1500, and the polyether polyol having hydroxyl groups at only part of terminals is contained in an amount of 1 to 35 parts by weight based on 100 parts by weight of the polyester.

8 Claims, No Drawings

PRESSURE-SENSITIVE ADHESIVE COMPOSITION AND PRESSURE-SENSITIVE ADHESIVE SHEET

CROSS REFERENCE TO RELATED APPLICATIONS

This application is a National Stage of International Application No. PCT/JP2013/056326 filed Mar. 7, 2013, claiming priority based on Japanese Patent Application Nos. 2012-060669 filed Mar. 16, 2012 and 2013-043224 filed Mar. 5, 2013, the contents of all of which are incorporated herein by reference in their entirety.

TECHNICAL FIELD

The present invention relates to a polyester-based pressure-sensitive adhesive composition and a pressure-sensitive adhesive sheet using the composition.

BACKGROUND ART

In recent years, those having good wettability to a display surface as an adherend, and having adhesive strength proper for light peeling at the time of peeling off are required as a pressure-sensitive adhesive sheet for surface protection to be used for surface protection of display surfaces of electronic mobile appliances including smart phones as well as personal computers, televisions, and the like.

In such requests, silicone-based pressure-sensitive adhesives having high wettability have been used as pressure-sensitive adhesives for surface protection; however, they have a problem of high cost.

Further, awareness of environments has been considered to be important year by year, and extrication from dependence on petroleum is supposed to be an urgent issue, and it is highly expected to transfer to plant-derived materials without using petroleum resources as much as possible. In such a situation, a polyester-based pressure-sensitive adhesive using a dimer acid and a dimer diol derived from plants has been discussed (Patent Document 1), but also has a problem of high cost.

Therefore, in order to solve the above-mentioned problems, pressure-sensitive adhesive sheets for surface protection by using low cost acryl-based pressure-sensitive adhesives have been proposed (reference to Patent Documents 2 and 3).

However, in the case of using the acryl-based pressure-sensitive adhesives, a plasticizer is used and there occurs a problem of bleeding out of a plasticizer component and thus causing staining of an adherend after the acryl-based pressure-sensitive adhesives are bonded to a display surface as an adherend.

PRIOR ART DOCUMENT

Patent Documents

Patent Document 1: JP-A-2008-13593
Patent Document 2: JP-A-2007-327012
Patent Document 3: JP-A-2010-248489

SUMMARY OF THE INVENTION

Problems to be Solved by the Invention

Accordingly, the present invention aims to provide a polyester-based pressure-sensitive adhesive composition which can be produced even from plant-derived raw materials with no need of using a costly silicone-based pressure-sensitive adhesive or the like and which is usable for producing a pressure-sensitive adhesive sheet (particularly for surface protection) excellent in wettability to an adherend, light peelability (removability), preventing properties for increasing adhesive strength (peel strength), anti-staining property (without bleed out, adhesive residues or the like), and workability, and to provide a pressure-sensitive adhesive sheet using the composition.

Means for Solving the Problems

The inventors of the present invention have made various investigations in order to solve the above-mentioned problems, and consequently found a polyester-based pressure-sensitive adhesive composition and a pressure-sensitive adhesive sheet as described below, and this finding has led to completion of the present invention.

That is, the polyester-based pressure-sensitive adhesive composition of the present invention comprises a polyester obtained by condensation polymerization of at least a dicarboxylic acid having a side chain and a diol, a polyether polyol, and a crosslinking agent, wherein the polyester has a weight average molecular weight of 5000 to 50000, the polyether polyol contains a polyether polyol having hydroxyl groups at only part of terminals and/or all terminals, the polyether polyol having hydroxyl groups at only part of terminals has a number average molecular weight of 100 to 1500, and the polyether polyol having hydroxyl groups at only part of terminals is contained in an amount of 1 to 35 parts by weight based on 100 parts by weight of the polyester.

In the polyester-based pressure-sensitive adhesive composition of the present invention, the polyether polyol having hydroxyl groups at all terminals preferably has a number average molecular weight of 100 to 5000, and the polyether polyol having hydroxyl groups at all terminals is preferably contained in an amount of 1 to 400 parts by weight based on 100 parts by weight of the polyester.

In the polyester-based pressure-sensitive adhesive composition of the present invention, the dicarboxylic acid and the diol are preferably contained at a mole ratio of 1:(1.08 to 2.10).

In the polyester-based pressure-sensitive adhesive composition of the present invention, the side chain of the dicarboxylic acid is preferably an alkyl group.

The pressure-sensitive adhesive sheet of the present invention is preferably a pressure-sensitive adhesive sheet comprising a support and a pressure-sensitive adhesive layer obtained by crosslinking the polyester-based pressure-sensitive adhesive composition and formed on at least one surface of the support.

In the pressure-sensitive adhesive sheet of the present invention, the pressure-sensitive adhesive layer has a gel fraction of 40 to 95% by weight.

The pressure-sensitive adhesive sheet of the present invention preferably has an adhesive strength to glass of 1.0 N/25 mm or less.

The pressure-sensitive adhesive sheet of the present invention is preferably used for surface protection.

Effect of the Invention

The present invention can provide a polyester-based pressure-sensitive adhesive composition which can be produced even from plant-derived raw materials with no need of using a costly silicone-based pressure-sensitive adhesive or the like and which is usable for producing a pressure-sensitive adhesive sheet (particularly for surface protection) excellent in wettability to an adherend, light peelability (removability), preventing properties for increasing adhesive strength (peel strength), anti-staining property (without bleed out, adhesive residues or the like), and workability, and a pressure-sensitive adhesive sheet using the composition, and thus the present invention is useful.

Mode for Carrying Out the Invention

<Polyester>

The polyester to be used for the polyester-based pressure-sensitive adhesive composition of the present invention is a polyester obtained by condensation polymerization of at least a dicarboxylic acid having a side chain and a diol. A polyester synthesis method is not particularly limited, and a publicly-known polymerization method may be used.

It is a preferable embodiment that the polyester is produced from plant-derived raw materials. The reason for this is that a plant-derived raw material is biodegradable, is said to be so-called carbon neutral, is friendly to global environments, and is suitable for obtaining an environment-friendly pressure-sensitive adhesive.

The dicarboxylic acid is one which has a side chain and two carboxyl groups as a functional group, and is preferably one having an alkyl group as the side chain. The dicarboxylic acid has a side chain, and therefore the flexibility is increased. Further the side chain is an alkyl group, which makes hydrolysis of the polyester difficult to be caused, and therefore it is a preferable embodiment. Specific examples of the dicarboxylic acid include plant-derived dicarboxylic acids. Examples of other dicarboxylic acids include aliphatic and alicyclic dicarboxylic acids such as adipic acid, azelaic acid, 1,4-cyclohexanedicarboxylic acid, fumaric acid, succinic acid, dodecanedioic acid, maleic acid, maleic anhydride, and itaconic acid; as well as terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenyl ether dicarboxylic acid. Specific examples of the dicarboxylic acid having a side chain include plant-derived dicarboxylic acids such as dimer acids derived from a castor oil-derived sebacic acid, oleic acid and erucic acid, 4-methyl-1,2-cyclohexanedicarboxylic acid, dodecenyl succinic anhydride, hexahydrophthalic anhydride, tetrahydrophthalic anhydride and citraconic acid. Among them, dimer acids and the like are preferable in terms of plant-derived acids and friendliness to global environments. These acids may be used alone or in combination of two or more of them.

As the diol, diols having two hydroxyl groups as functional groups may be used without any particular limitation if they do not adversely affect the characteristics of the present invention, and diols each having a side chain are preferable, and diols each having an alkyl group as the side chain are more preferable. In the case where the diol has a side chain, the flexibility is increased, and in the case where the side chain is an alkyl group, hydrolysis of the polyester is difficult to be caused, and therefore it is a preferable embodiment.

Specific examples of the diol include, as plant-derived diols, aliphatic esters derived from castor oil, dimer diols derived from oleic acid, erucic acid etc., and glycerol monostearate. Examples of other diol components include aliphatic glycols such as ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol; and, as those other than the aliphatic glycols, bisphenol A ethylene oxide adducts and propylene oxide adducts, hydrogenated bisphenol A ethylene oxide adducts and propylene oxide adducts, polytetramethylene glycol, polypropylene glycol, polyethylene glycol, and polycarbonate glycol. Among them, plant-derived diols are particularly preferable in terms of friendliness to global environments. These diols may be used alone or in combination of two or more of them.

The mole ratio of the dicarboxylic acid and the diol is preferably 1:(1.08 to 2.10), more preferably 1:(1.09 to 2.05), and furthermore preferably 1:(1.10 to 2.00). If the mole ratio is smaller than 1:1.08, the molecular weight of the polyester to be obtained becomes high, and a hydroxyl group to be served as a functional group is lessened to make it difficult to accelerate crosslinking reaction even if a crosslinking agent (e.g., polyfunctional isocyanate) is used, so that a pressure-sensitive adhesive layer with a desired gel fraction is not obtained. On the other hand, if the mole ratio exceeds 1:2.10, only a polyester with a molecular weight smaller than the desired molecular weight tends to be obtained, and even if a crosslinking agent is used, gelation cannot be promoted and it results in that a pressure-sensitive adhesive layer with a desired gel fraction is not obtained, and therefore it is not preferable. The mole number of the dicarboxylic acid and that of the diol are similar to each other, and when the mole ratio becomes close to 1:1, the molecular weight of the polyester to be obtained is increased, and thus the adhesive strength (peel strength) is increased and light peeling cannot be achieved. Accordingly, these are not preferable in the pressure-sensitive adhesive sheet for surface protection.

The polyester to be used for the polyester-based pressure-sensitive adhesive composition of the present invention has a weight average molecular weight (Mw) of 5000 to 50000, preferably 5500 to 45000, and more preferably 6000 to 40000. The case where the weight average molecular weight is less than 5000 causes a decrease in adhesive strength of a pressure-sensitive adhesive using the polyester, and a pressure-sensitive adhesive sheet (pressure-sensitive adhesive layer) itself may not be fixed to an adherend. On the other hand, the case where the weight average molecular weight exceeds 50000 may become a cause of a decrease in cohesive strength or a decrease in holding strength, and therefore it is not preferable.

Other components can be polymerized or added after polymerization to an extent that the properties of the polyester to be used for the pressure-sensitive adhesive sheet of the present invention are not adversely affected, and examples include polyhydric hydroxyl group-containing compounds, e.g., tri- or higher functional hydroxyl group-containing compounds such as trimethylolpropane, pentaerythritol, and dipentaerythritol; polyvalent carboxylic acids, e.g., tri- or higher functional carboxylic acid compounds such as trimellitic acid, pyromellitic acid, and benzophenone tetracarboxylic acid; and compounds having hydroxyl groups and the like and carboxyl groups and the like such as glycolic acid, hydroxypivalic acid, 3-hydroxy-2-methylpropionic acid, lactic acid, glyceric acid, malic acid, and citric acid. These compounds may be used alone or in combination of two or more of them.

In the present invention, the polymerization (condensation polymerization) reaction of the dicarboxylic acid and the aliphatic diol may be carried out using a solvent or using no solvent under reduced pressure, and a conventionally known method may be used.

Examples of a method of removing water produced by the polymerization (condensation) reaction include a method in which azeotropic dehydration is conducted using toluene or xylene, a method in which an inert gas is bubbled into a reaction system thereby ejecting produced water and monoalcohol out of the reaction system, together with the inert gas, and a method of distilling under reduced pressure.

It is possible to use, as a polymerization catalyst used in the polymerization (condensation) reaction, those used as a polymerization catalyst used in a conventional polyester, and examples of usable polymerization catalyst include, but are not limited to, various metal compounds such as titanium-based, tin-based, antimony-based, zinc-based and germanium-based compounds; and strong acid compounds such as p-toluenesulfonic acid and sulfuric acid.

<Polyester-Based Pressure-Sensitive Adhesive Composition>

The polyester-based pressure-sensitive adhesive composition of the present invention contains a polyether polyol. A polyether polyol can be added in the pressure-sensitive adhesive composition by carrying out crosslinking reaction of the polyester and polyether polyol with the use of a crosslinking agent. Particularly, addition of a polyether polyol makes it possible to obtain a pressure-sensitive adhesive layer (pressure-sensitive adhesive sheet, surface protective sheet) which is excellent in wettability and which suppresses inclusion of air bubbles.

The polyether polyol is not particularly limited and conventionally known polyether polyols can be used, and examples thereof to be used include bifunctional polyether polyols such as polyethylene glycol, polypropylene glycol, polybutylene glycol, and polytetramethylene glycol; trifunctional polyether polyols such as trimethylolpropane tripolyoxyethylene ether glycol; tetrafunctional polyether polyols such as pentaerythritol polyoxyethylene ether; polyoxyalkylene glycols such as polytrimethylene ether glycol; copolyether polyols of 1 to 20% by mole 3-methyltetrahydrofuran and tetrahydrofuran (e.g., "PTG-L1000", "PTG-L2000", "PTG-L3000", etc., manufactured by Hodogaya Chemical Co., Ltd.); copolyether glycols of neopentyl glycol and tetrahydrofuran; and polyoxypropylene glycol. Polyether polyols derived from plants are preferable in terms of friendliness to global environments. These polyether polyols may be used alone or in combination of two or more of them.

Further, the polyether polyol to be used may be block copolymer-based and random copolymer-based polyether polyols such as polyoxyethylene-polyoxypropylene glycol. Further, part of terminal hydroxyl groups may be modified with aliphatic hydrocarbon groups such as a methyl group, an ethyl group, an allyl group, a propyl group, a butyl group, and a 2-ethylhexyl group; or aromatic hydrocarbon groups such as a phenyl group, a methylphenyl group, a nonylphenyl group, and a benzyl group to remove reactivity. However, if all of the functional groups are modified, the reactivity is completely removed and crosslinking reaction with the polyester cannot be caused, and it results in bleeding out of the polyether polyol itself to the pressure-sensitive adhesive surface, and therefore it is not preferable. In order to obtain particularly good adhesive properties, those having branched chain structures in the molecular skeletons such as polypropylene glycol and polybutylene glycol should be used. It is assumed that the polymer chain mobility is high and the contribution in the vicinity of the pressure-sensitive adhesive surface becomes significant. Further, those obtained by modifying part of all terminal hydroxyl groups (terminal functional groups) are more useful. This is because the molecular chain having non-reactivity by the modification is free, and thus the molecular mobility is further heightened, and it is made easy to adjust adhesive properties as desired, and therefore it is preferable.

In the case of polyether polyols in which in which all terminal hydroxyl groups (terminal functional groups) are not modified, the polyether polyol has a number average molecular weight (Mn) of preferably 100 to 5000, more preferably 200 to 4000, and furthermore preferably 300 to 3000. If the molecular weight is less than 100, the effect of improving adhesive properties is small, and if the molecular weight is more than 5000, the polyether polyol itself tends to bleed out easily and to cause staining, and therefore it is not preferable. When the molecular weight is adjusted so as to be within the above range, good wettability is provided and inclusion of air bubbles is suppressed, and further, compatibility with the polyester is improved, no appearance defect tends to be caused, and it may be result in prevention of occurrence of bleed out or the like, and no stain remains on an adherend, and therefore it is preferable.

In the case of polyether polyols in which part of all terminal hydroxyl groups (terminal functional groups) is modified, the polyether polyol has a number average molecular weight (Mn) of 100 to 1500, preferably 200 to 1200, and more preferably 300 to 1000. If the molecular weight is less than 100, the effect of improving adhesive properties is small, and if the molecular weight is more than 1500, the polyether polyol itself tends to bleed out easily and to cause staining, and therefore it is not preferable.

In the case of polyether polyols in which all terminal hydroxyl groups (terminal functional groups) are not modified, the blending amount of the polyether polyol is preferably 1 to 400 parts by weight, more preferably 3 to 300 parts by weight, and furthermore preferably 5 to 200 parts by weight based on 100 parts by weight of the polyester. If the blending amount is less than 1 part by weight, the effect of improving adhesive properties cannot be caused, and if the blending amount is more than 400 parts by weight, the polyether polyol itself tends to bleed out easily and to cause staining, and therefore it is not preferable. When the blending amount is adjusted so as to be within the above range, good wettability is provided and inclusion of air bubbles is suppressed, and further, compatibility with the polyester is improved, no appearance defect tends to be caused, and it may be result in prevention of occurrence of bleed out or the like, and no stain remains on an adherend, and therefore it is preferable.

In the case of polyether polyols in which part of all terminal hydroxyl groups (terminal functional groups) is modified, the blending amount of the polyether polyol is 1 to 35 parts by weight, preferably 3 to 32 parts by weight, and more preferably 5 to 28 parts by weight based on 100 parts by weight of the polyester. If the blending amount is less than 1 part by weight, the effect of improving adhesive properties cannot be caused, and if the blending amount is more than 35 parts by weight, the polyether polyol itself tends to bleed out easily and to cause staining, and therefore it is not preferable.

The polyester-based pressure-sensitive adhesive composition of the present invention contains a crosslinking agent. A pressure-sensitive adhesive layer can be formed by carrying out the crosslinking reaction of the pressure-sensitive adhesive composition using a crosslinking agent. The crosslinking agent is not particularly limited and conventionally known crosslinking agents can be used. Examples of the crosslinking agent that can be used include polyvalent isocyanurates, polyfunctional isocyanates, polyfunctional melamine compounds, polyfunctional epoxy compounds, polyfunctional oxazoline compounds, polyfunctional aziridine compounds, and metal chelate compounds. Particularly, in terms of transparency of the pressure-sensitive adhesive layer to be obtained and formation of a pressure-sensitive adhesive sheet (pressure-sensitive adhesive layer) with high gel fraction, the use of a polyvalent isocyanurate or a polyfunctional isocyanate compound is a preferable embodiment. These compounds may be used alone or in combination of two or more of them.

Examples of the polyvalent isocyanurate include a polyisocyanurate compound of hexamethylene diisocyanate. Use of the polyvalent isocyanurate is effective since it is possible to achieve an object of obtaining transparency and high gel fraction of the obtained pressure-sensitive adhesive layer. It is also possible to use commercially available products of the polyvalent isocyanurate and specific examples thereof include "DURANATE TPA-100" (trade name, manufactured by Asahi Kasei Chemicals Corporation), and "CORONATE HK", "CORONATE HX" and "CORONATE 2096" (trade names, manufactured by Nippon Polyurethane Industry Co., Ltd.).

As the polyfunctional isocyanate compound, a compound having at least two isocyanate groups in the molecule is preferably used, and a compound having three or more isocyanate groups in the molecule is more preferably used without any particular limitation. Specific examples may include aliphatic polyisocyanates, alicyclic polyisocyanates, and aromatic polyisocyanates.

Examples of the aliphatic polyisocyanates include tetramethylene diisocyanates such as 1,2-ethylene diisocyanate, 1,2-tetramethylene diisocyanate, 1,3-tetramethylene diisocyanate and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate and 2,5-hexamethylene diisocyanate; and 2-methyl-1,5-pentane diisocyanate, 3-methyl-1,5-pentane diisocyanate and lysin diisocyanate.

Examples of the alicyclic polyisocyanates include isophorone diisocyanate; cyclohexyl diisocyanates such as 1,2-cyclohexyl diisocyanate, 1,3-cyclohexyl diisocyanate and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenyletherdiisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate and xylylene-1,3-diisocyanate.

It is possible to use, as the polyfunctional isocyanate compound, for example, dimers and trimers of araliphatic polyisocyanates other than the aliphatic polyisocyanates, alicyclic polyisocyanates, aromatic polyisocyanates and araliphatic polyisocyanates. Specific examples thereof include a dimer and a trimer of diphenylmethane diisocyanate; a reaction product of trimethylolpropane and tolylene diisocyanate; a reaction product of trimethylolpropane and hexamethylene diisocyanate; and polymers such as polymethylene polyphenylisocyanate, polyether polyisocyanate and polyester polyisocyanate.

It is also possible to use commercially available products as the polyfunctional isocyanate compound, and specific examples thereof include "CORONATE L" (trade name, manufactured by Nippon Polyurethane Industry Co., Ltd.) as a trimer adduct of trimethylolpropane and tolylene diisocyanate, and "CORONATE HL" (trade name, manufactured by Nippon Polyurethane Industry Co., Ltd.) as a trimer adduct of trimethylolpropane and hexamethylene diisocyanate.

Examples of the polyfunctional melamine compound include methylated methylolmelamine and butylated hexamethylolmelamine, and examples of the polyfunctional epoxy compound include diglycidylaniline and glycerin diglycidyl ether.

The kind and blending amount of the crosslinking agent are not particularly limited and, for example, in the case of a pressure-sensitive adhesive sheet for surface protection, it is preferable to blend the crosslinking agent such that the pressure-sensitive adhesive layer to be formed has a gel fraction of preferably 40 to 95% by weight, more preferably 45 to 93% by weight, and furthermore preferably 50 to 92% by weight. If the gel fraction is less than 40% by weight, unreacted polyether polyols may remain in a large amount and stain an adherend, and further it is not preferable in terms of handleability. The adhesive strength (peel strength) may be increased over time or an adherend may be stained at the time of peeling the pressure-sensitive adhesive layer (pressure-sensitive adhesive sheet), and it may result in inferiority in light peelability (removability), and therefore it is not preferable also in terms of handleability (workability). On the other hand, if the gel fraction exceeds 95% by weight, the polyether polyol are restricted and prevented from coming to the pressure-sensitive adhesive surface to lower wettability to an adherend or lower adhesive strength, so that the pressure-sensitive adhesive sheet itself may not be fixed to an adherend, and the pressure-sensitive adhesive sheet cannot be used for surface protection, and therefore it is not preferable.

The blending amount of the crosslinking agent is preferably, for example, 2 to 30 parts by weight, more preferably 3 to 28 parts by weight, and furthermore preferably 4 to 26 parts by weight based on 100 parts by weight of the polyester. If the blending amount is less than 2 parts by weight, the cohesive strength cannot be increased in the case of forming a pressure-sensitive adhesive layer, unreacted polyether polyols remain in a large amount, and it results in a cause of staining of an adherend. On the other hand, if the blending amount is more than 30 parts by weight, the crosslinking agent exists in excess so that defects that the adhesive strength is increased over time after bonding and that an adherend is stained may be caused, and therefore it is not preferable. The blending amount of the crosslinking agent is preferably, for example, 2 to 50 parts by weight, more preferably 3 to 40 parts by weight, and furthermore preferably 4 to 30 parts by weight based on 100 parts by weight in total of the polyester and the polyether polyol. If the blending amount is less than 2 parts by weight, the cohesive strength cannot be increased in the case of forming a pressure-sensitive adhesive layer, unreacted polyether polyols remain in a large amount, and it results in a cause of staining of an adherend. On the other hand, if the blending amount is more than 50 parts by weight, the crosslinking agent exists in excess so that defects that the adhesive strength is increased over time after bonding and that an adherend is stained may be caused, and therefore it is not preferable.

In order to efficiently adjust the gel fraction in the pressure-sensitive adhesive layer to be used for the pressure-sensitive adhesive sheet of the present invention, a crosslinking catalyst may be properly used. Examples of the catalyst include tetra-n-butyl titanate, tetraisopropyl titanate, butyltin oxide, and dioctyltin dilaurate. These catalysts may be used alone or in combination of two or more of them.

The blending amount of the catalyst is not particularly limited, but is preferably 0.01 to 1 part by weight and more preferably 0.05 to 0.5 parts by weight based on 100 parts by weight of the polyester. If the blending amount is less than 0.01 parts by weight, the effect of catalyst addition may not be obtained, and if the blending amount exceeds 1 part by weight, the shelf life is considerably shortened and the stability for application may be lowered, and therefore it is not preferable.

In order to prolong the shelf life, acetyl acetone, methanol, methyl orthoacetate, and the like may be also blended properly as a retarder.

In order to form a pressure-sensitive adhesive layer to be used for the pressure-sensitive adhesive sheet of the present invention, a tackifier may be used in combination with the polyester together with the crosslinking agent, and therefore a pressure-sensitive adhesive layer with desired properties can be formed.

The tackifier is not particularly limited, and conventionally and publicly-known tackifiers can be used, and examples thereof include terpene-based tackifiers, phenolic tackifiers, rosin-based tackifiers, aliphatic petroleum resins, aromatic petroleum resins, copolymer-based petroleum resins, alicyclic petroleum resins, xylene resins, epoxy-based tackifiers, polyamide-based tackifiers, ketone-based tackifiers, and elastomer-based tackifiers. Particularly, in order to improve a biomass degree, rosin-based tackifiers and terpene-based tackifiers produced from plant-derived raw materials are preferably used. These resins may be used alone or in combination of two or more of them. The biomass degree means the ratio of plant-derived raw materials to be used which is calculated from the weight of the plant-derived raw materials to be used to the weight of all raw materials to be used constituting the polyester-based pressure-sensitive adhesive composition.

Examples of the terpene-basedtackifiers include terpene resins, terpene-phenol resins, and aromatic modified terpene resins, and specific examples of the terpene-based tackifiers that can be used include an α-pinene polymer, a β-pinene polymer, and a dipentene polymer, and terpene resins obtained by phenol modification, aromatic modification, hydrogenation modification, and hydrocarbon modification of the above polymers.

Specifically, it is possible to use, as the phenol-based tackifier, condensates of various phenols such as phenol, m-cresol, 3,5-xylenol, p-alkylphenol and resorcin, and formaldehyde can be used. It is also possible to use resol obtained by an addition reaction of the phenols and formaldehyde in the presence of an alkali catalyst, novolak obtained by a condensation reaction of the phenols and formaldehyde in the presence of an acid catalyst, and a rosin-modified phenol resin obtained by adding phenol to rosins such as an unmodified or modified rosin, or a derivatives thereof in the presence of an acid catalyst, followed by thermopolymerization.

Examples of the rosin-based tackifiers include rosin resins, polymerized rosin resins, hydrogenated rosin resins, rosin ester resins, hydrogenated rosin ester resins, and rosin phenol resins, and specific examples of the rosin-based tackifiers that can be used include unmodified rosins (raw rosins) such as gum rosin, wood rosin, and tall oil rosin; and modified rosins obtained by subjecting these unmodified rosins to hydrogenation, disproportionation, polymerization, and other chemical modification.

The blending amount of the tackifier is preferably 0 to 50 parts by weight, more preferably 2 to 30 parts by weight, and particularly preferably 5 to 20 parts by weight based on 100 parts by weight of the polyester. If the blending amount exceeds 50 parts by weight, the adhesive strength is increased and re-peeling may become difficult after exposure to high temperature environments, and therefore it is not preferable.

General additives such as an ultraviolet absorber, a photostabilizer, a peeling adjustment agent, a plasticizer, a softening agent, a filler, coloring agents such as a pigment and a dye, an aging prevention agent, and a surfactant may be used to an extent that the properties of the pressure-sensitive adhesive layer (pressure-sensitive adhesive) to be used for the pressure-sensitive adhesive sheet of the present invention are not adversely affected.

The thickness of the pressure-sensitive adhesive layer (after drying) may be properly selected, but the thickness is preferably, for example, about 1 to 100 µm, more preferably about 3 to 80 µm, and particularly preferably about 5 to 60 µm. If the thickness of the pressure-sensitive adhesive layer is thinner than 1 µm, it becomes difficult to obtain sufficient adhesive strength, and the pressure-sensitive adhesive sheet (pressure-sensitive adhesive layer) itself cannot be fixed to an adherend and may tend to be easily peeled. If the thickness exceeds 100 µm, the adhesive strength is increased over time so that the pressure-sensitive adhesive sheet is hard to be peeled, and therefore it is not preferable. The pressure-sensitive adhesive layer may be any of a mono layer form or a layered form.

The pressure-sensitive adhesive sheet of the present invention is obtained by comprising a support and the pressure-sensitive adhesive layer formed on at least one surface of the support. The pressure-sensitive adhesive sheet may have an interlayer or an undercoating layer without any problem to an extent that the properties of the pressure-sensitive adhesive sheet of the present invention are not adversely affected.

The support is not particularly limited and conventionally known supports can be used, that is, various kinds of supports (substrates) such as a plastic film, porous materials including paper sheets and non-woven fabrics may be used. In the case of use for surface protection, it is a preferable embodiment to use a plastic film in terms of durability and the like. Examples of the plastic film may include polyolefin films of polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer, ethylene-vinyl alcohol copolymer, and the like; polyester films of polyethylene terephthalate, polyethylene naphthalate, polybutylene terephthalate, and the like; polyacrylate films; polystyrene films; polyamide films of nylon6, nylon6,6, partially aromatic polyamide, and the like; polyvinyl chloride films; polyvinylidene chloride films; and polycarbonate films. A support made of polylactic acid or cellulose produced from plant-derived raw materials can be preferably used.

In the support, if necessary, various additives used in a conventional substrate for a pressure-sensitive adhesive tape (support), such as ultraviolet absorbers, photostabilizers, antioxidants, fillers, pigments and dyes can be used.

If necessary, a surface of the support (substrate) may be subjected to common surface treatment in order to increase anchoring to the pressure-sensitive adhesive layer, and for example, oxidation treatment by chemical or physical method such as chromate treatment, exposure to ozone, exposure to flames, exposure to high voltage electric shock, or ionization radiation treatment may be carried out, or coating treatment with an undercoating agent or the like may be carried out. Further, in order to provide peeling properties, for example, coating treatment with a peeling agent of a silicone-based resin, a fluoro resin, or the like may be carried out between various kinds of pressure-sensitive adhesive layers to be formed on the support.

The thickness of the support (substrate) may be selected properly depending on its material or configuration, but the thickness is preferably, for example, 1000 μm or thinner, more preferably about 1 to 500 μm, furthermore preferably about 2 to 400 μm, still more preferably about 3 to 300 μm, and particularly preferably about 5 to 200 μm.

As a method for forming the pressure-sensitive adhesive layer, a conventionally known method may be employed, and the formation method can be carried out based on a publicly-known production method of a pressure-sensitive adhesive sheet such as a method for forming a pressure-sensitive adhesive layer by applying a pressure-sensitive adhesive composition (a pressure-sensitive adhesive composition solution obtained by dissolving the pressure-sensitive adhesive composition in a solvent or a thermally melted solution) to the support (substrate) and drying the composition; a method for forming a pressure-sensitive adhesive layer by applying the pressure-sensitive adhesive composition to the support, drying the composition to form a pressure-sensitive adhesive composition layer, and further carrying out crosslinking treatment to form a pressure-sensitive adhesive layer; a method for transferring a pressure-sensitive adhesive layer formed on a release liner by application to a support; a method for extruding a material for forming a pressure-sensitive adhesive layer to a support (substrate), followed by application; a method for extruding a pressure-sensitive adhesive layer in a bi- or multi-layer form on a support (substrate); a method for mono-layer lamination of a pressure-sensitive adhesive layer on a support (substrate). Further, a method for bi- or multi-layer co-extrusion of a pressure-sensitive adhesive layer together with a support (substrate) made of a thermoplastic resin by an inflation method or a T-die method may be used. The pressure-sensitive adhesive sheet in the present invention includes a pressure-sensitive adhesive film, a pressure-sensitive adhesive tape, and the like.

As a method for applying the pressure-sensitive adhesive composition (solution), a conventionally known method may be employed, and examples of the method include roll coating, gravure coating, reverse roll coating, roll brush coating, air knife coating, spray coating, and extrusion coating with a die coater or the like.

The release liner is not particularly limited, and any conventionally known release liner may be properly used. For example, a product obtained by forming a release coating layer on at least one side of a substrate (substrate for release liner) may be used. The substrate for release liner may be used in the form of a monolayer or multilayer configuration.

Any of various thin materials such as plastic films, paper sheets, foamed products, and metal foils may be used as the substrate for release liner. A plastic film is particularly preferred. Examples of the material for the plastic film include polyester such as polyethylene terephthalate, polyolefin such as polypropylene or ethylene-propylene copolymer, and thermoplastic resin such as polyvinyl chloride.

The thickness of the substrate for release liner may be properly selected in accordance with the purpose.

The formation of the pressure-sensitive adhesive layer is not particularly limited, but the temperature for drying after application of the pressure-sensitive adhesive composition (solution) may be normally 60 to 150° C. and preferably 70 to 140° C.

EXAMPLES

The present invention will be described more in detail with reference to Examples of the present invention; however, the present invention is not limited by Examples. In Examples, "part(s)" means "part(s) by weight". The physical properties of polyesters and the blending contents and evaluation results of pressure-sensitive adhesive layers (pressure-sensitive adhesive sheets) are shown in Table 1 and Table 2.

<Preparation of Polyester A-1>

A three-neck separable flask equipped with a stirrer, a thermometer and a condenser was charged with 100.9 parts of a dimer acid (trade name: "Pripol 1009", manufactured by Croda, weight average molecular weight: 567) as a dicarboxylic acid and 100 parts of a dimer diol (trade name: "Pripol 2033", manufactured by Croda, weight average molecular weight: 537) as a diol so that the mole ratio of the dimer acid and the dimer diol was 1:1.05, and 0.1 parts of titanium tetraisopropoxide (manufactured by Kishida Chemical Co., Ltd.) as a catalyst, and the contents were heated to 200° C. and kept at this temperature while being stirred in a reduced pressure atmosphere (0.002 MPA). The reaction was continued for about 5 hours to obtain a polyester A-1. The polyester A-1 had a weight average molecular weight (Mw) of 55000.

<Preparation of Polyester A-2>

A three-neck separable flask equipped with a stirrer, a thermometer and a condenser was charged with 92.2 parts of a dimer acid (trade name: "Pripol 1009", manufactured by Croda, weight average molecular weight: 567) as a dicarboxylic acid and 100 parts of a dimer diol (trade name: "Pripol 2033", manufactured by Croda, weight average molecular weight: 537) as a diol so that the mole ratio of the dimer acid and the dimer diol was 1.00:1.15, and 0.1 parts of titanium tetraisopropoxide (manufactured by Kishida Chemical Co., Ltd.) as a catalyst, and the contents were heated to 200° C. and kept at this temperature while being stirred in a reduced pressure atmosphere (0.002 MPA). The reaction was continued for about 5 hours to obtain a polyester A-2. The polyester A-2 had a weight average molecular weight (Mw) of 23000.

<Preparation of polyester A-3>

A three-neck separable flask equipped with a stirrer, a thermometer and a condenser was charged with 70.7 parts of a dimer acid (trade name: "Pripol 1009", manufactured by Croda, weight average molecular weight: 567) as a dicarboxylic acid and 100 parts of a dimer diol (trade name: "Pripol 2033", manufactured by Croda, weight average molecular weight: 537) as a diol so that the mole ratio of the dimer acid and the dimer diol was 1.00:1.50, and 0.1 parts of titanium tetraisopropoxide (manufactured by Kishida Chemical Co., Ltd.) as a catalyst, and the contents were heated to 200° C. and kept at this temperature while being stirred in a reduced pressure atmosphere (0.002 MPA). The reaction was continued for about 5 hours to obtain a polyester A-3. The polyester A-3 had a weight average molecular weight (Mw) of 9000.

<Preparation of Polyester A-4>

A four-neck separable flask equipped with a stirrer, a thermometer, a nitrogen introduction tube, and a condenser having a trap was charged with 619 parts of a dimer acid (trade name: "Pripol 1009", manufactured by Croda, weight average molecular weight: 567) as a dicarboxylic acid and 100 parts of propylene glycol (trade name: "Propylene glycol", manufactured by Wako Pure Chemical Industries, Ltd., weight average molecular weight: 76) as a diol so that the mole ratio of the dimer acid and the propylene glycol was 1.00:1.20, and 0.1 parts of dibutyltin(IV) oxide (manufactured by Kishida Chemical Co., Ltd.) as a catalyst, and the contents were heated to 160° C. and kept at this temperature while being stirred in normal pressure. While water produced by the reaction was removed by the condenser, the reaction was continued for about 14 hours. Further, the nitrogen introduction tube and the condenser having a trap were taken out and a vacuum pump was attached, and then the contents were kept at 160° C. while being stirred in a reduced pressure atmosphere (0.002 MPA). The reaction was continued for about 4 hours to obtain a polyester A-4. The polyester A-4 had a weight average molecular weight (Mw) of 4000.

<Preparation of Polyester A-5>

A four-neck separable flask equipped with a stirrer, a thermometer, a nitrogen introduction tube, and a condenser having a trap was charged with 502 parts of a dimer acid (trade name: "Pripol 1009", manufactured by Croda, weight average molecular weight: 567) as a dicarboxylic acid and 100 parts of 1,4-butanediol (trade name: "1,4-Butanediol", manufactured by Wako Pure Chemical Industries, Ltd., weight average molecular weight: 90) as a diol so that the mole ratio of the dimer acid and the 1,4-butanediol was 1.00:1.25, and 0.1 parts of dibutyltin(IV) oxide (manufactured by Kishida Chemical Co., Ltd.) as a catalyst, and the contents were heated to 200° C. and kept at this temperature while being stirred in normal pressure. While water produced by the reaction was removed by the condenser, the reaction was continued for about 4 hours. Further, the nitrogen introduction tube and the condenser having a trap were taken out and a vacuum pump was attached, and then the contents were kept at 200° C. while being stirred in a reduced pressure atmosphere (0.010 MPA). The reaction was continued for about 4 hours to obtain a polyester A-5. The polyester A-5 had a weight average molecular weight (Mw) of 24000.

<Preparation of Polyester A-6>

A three-neck separable flask equipped with a stirrer, a thermometer, a nitrogen introduction tube, and a condenser having a trap was charged with 100 parts by weight of a dimer acid (trade name: "Pripol 1009", manufactured by Croda, molecular weight: 567) as a dicarboxylic acid and 24 parts by weight of 1,4-butanediol (manufactured by Wako Pure Chemical Industries, Ltd., molecular weight: 90) as a diol so that the mole ratio of the dimer acid and the 1,4-butanediol was 1:1.56, and 0.2 parts by weight of dibutyltin oxide (manufactured by Wako Pure Chemical Industries, Ltd.) as a catalyst, and the contents were heated to 180° C. and kept at this temperature for 8 hours while being stirred in nitrogen atmosphere.

Thereafter, the nitrogen introduction tube and the condenser were taken out and a vacuum pump was attached instead, and the contents were heated to 200° C. and kept at this temperature while being stirred in a reduced pressure atmosphere (0.002 MPa). The reaction was continued for about 10 hours to obtain a polyester A-6. The polyester A-6 had a weight average molecular weight (Mw) of 10000.

<Preparation of Polyester A-7>

A three-neck separable flask equipped with a stirrer, a thermometer, a nitrogen introduction tube, and a condenser having a trap was charged with 100 parts by weight of a dimer acid (trade name: "Pripol 1009", manufactured by Croda, molecular weight: 567) as a dicarboxylic acid and 17.5 parts by weight of 1,4-butanediol (manufactured by Wako Pure Chemical Industries, Ltd., molecular weight: 90) as a diol so that the mole ratio of the dimer acid and the 1,4-butanediol was 1:1.1, and 0.2 parts by weight of dibutyltin oxide (manufactured by Wako Pure Chemical Industries, Ltd.) as a catalyst, and the contents were heated to 180° C. and kept at this temperature for 8 hours while being stirred in nitrogen atmosphere.

Thereafter, the nitrogen introduction tube and the condenser were taken out and a vacuum pump was attached instead, and the contents were heated to 200° C. and kept at this temperature while being stirred in a reduced pressure atmosphere (0.002 MPa). The reaction was continued for about 4 hours to obtain a polyester A-7. The polyester A-7 had a weight average molecular weight (Mw) of 70000.

<Polyether Polyol>

B-1: Trade name: "Sannix PP-400", manufactured by Sanyo Chemical Industries, Ltd., polypropylene glycol containing hydroxyl groups at both terminals, number average molecular weight (Mn): 400

B-2: Trade name: "Sannix PP-2000", manufactured by Sanyo Chemical Industries, Ltd., polypropylene glycol containing hydroxyl groups at both terminals, number average molecular weight (Mn): 2000

B-3: Trade name: "Smack MP-70", manufactured by Kao Corporation, polypropylene glycol containing methyl ether group at one terminal, number average molecular weight (Mn): 439

B-4: Trade name: "Reokon 1015H", manufactured by Lion Corporation, polypropylene glycol containing 2-ethylhexyl ether group at one terminal, number average molecular weight (Mn): 800

B-5: Trade name: "BLAUNONBUP-1900", manufactured by Aoki Oil Industrial Co., Ltd., polypropylene glycol containing butyl ether group at one terminal, number average molecular weight (Mn): 1900

B-6: Trade name: "Uniol PB-500", manufactured by NOF Corporation, polybutylene glycol containing hydroxyl groups at both terminals, number average molecular weight (Mn): 500

B-7: Trade name: "PEG-400", manufactured by Sanyo Chemical Industries, Ltd., polyethylene glycol containing hydroxyl groups at both terminals, number average molecular weight (Mn): 400

B-8: Trade name: "PTG-1000SN", manufactured by Hodogaya Chemical Co., Ltd., polytetramethylene ether glycol containing hydroxyl groups at both terminals, number average molecular weight (Mn): 1000

B-9: Trade name: "PTG-3000SN", manufactured by Hodogaya Chemical Co., Ltd., polytetramethylene ether glycol, number average molecular weight (Mn): 3000

B-10: Trade name: "PTG-2000SN", manufactured by Hodogaya Chemical Co., Ltd., polytetramethylene ether glycol containing hydroxyl groups at both terminals, number average molecular weight (Mn): 2000

B-11: Trade name: "Cerenol H1000", manufactured by DuPont, polytrimethylene ether glycol containing hydroxyl groups at both terminals, number average molecular weight (Mn): 1000

B-12: Trade name: "Sannix PP-3000", manufactured by Sanyo Chemical Industries, Ltd., polyoxypropylene glycol containing hydroxyl groups at both terminals, number average molecular weight (Mn): 3200

B-13: Trade name: "PTG-L1000", manufactured by Hodogaya Chemical Co., Ltd., copolyether polyol containing hydroxyl groups at both terminals, number average molecular weight (Mn): 1000

B-14: Trade name: "PTG-L2000", manufactured by Hodogaya Chemical Co., Ltd., copolyether polyol containing hydroxyl groups at both terminals, number average molecular weight (Mn): 2000

B-15: Trade name: "PTG-L3000", manufactured by Hodogaya Chemical Co., Ltd., copolyether polyol containing hydroxyl groups at both terminals, number average molecular weight (Mn): 3000

<Crosslinking Agent>

C-1: Trade name: "Desmodur N3600", manufactured by Sumika Bayer Co., Ltd., isocyanurate-based polyhexamethylene diisocyanate C-2: Trade name: "CORONATE HK", manufactured by Nippon Polyurethane Industry Co., Ltd., isocyanurate polymeric form polyhexamethylene diisocyanate C-3: Trade name: "DURANATE D101", manufactured by Asahi Kasei Chemicals Corporation, hexamethylene diisocyanate C-4: Trade name: "TPA-100", manufactured by Asahi Kasei Chemicals Corporation, polyhexamethylene diisocyanate Example 1

Twenty-five parts of the polyether polyol B-3, and, as a crosslinking agent, 25 parts of isocyanurate-based polyhexamethylene diisocyanate (trade name: "Desmodur N3600", manufactured by Sumika Bayer Co., Ltd.) and 50 to 150 parts of toluene as a solvent were blended with 100 parts of the polyester A-3 to adjust viscosity (e.g., about 10 Pa·s) for easy application and processing, so that a polyester-based pressure-sensitive adhesive composition was obtained. This composition was applied to a polyethylene terephthalate (PET) film (trade name: "Lumirror 38 S10", manufactured by PANAC Corporation) with 38 μm thickness as a substrate in such a manner that the pressure-sensitive adhesive layer obtained by drying (after drying) had a thickness of 10 μm, and dried at 100° C. for 3 minutes to obtain a pressure-sensitive adhesive layer. Thereafter, the pressure-sensitive adhesive layer was bonded to the peeling-treated surface of a polyethylene terephthalate (PET) film (thickness: 38 μm, trade name: "Diafoil MRE#38", manufactured by Mitsubishi Plastics Inc.) subjected to peeling treatment, and the resultant was left at 40° C. for 7 days to obtain a pressure-sensitive adhesive sheet (for surface protection) having a support and a pressure-sensitive adhesive layer formed on the support.

Examples 2 to 8 and Comparative Examples 1 to 5

Pressure-sensitive adhesive sheets were obtained in the same manner as in Example 1, except that compositions were prepared by mixing the contents as shown in Table 1.

Example 9

A pressure-sensitive adhesive sheet (for surface protection) was obtained in the same manner as in Example 1, except that 50 parts of polyhexamethylene diisocyanate (trade name: "TPA-100", manufactured by Asahi Kasei Chemicals Corporation) as a crosslinking agent and 30 parts of polytetramethylene ether glycol having a number average molecular weight (Mn) of 1000 (trade name: "PTG-1000SN", manufactured by Hodogaya Chemical Co., Ltd.) were blended with 100 parts of the polyester A-6.

Example 10

A pressure-sensitive adhesive sheet (for surface protection) was obtained in the same manner as in Example 9, except that 100 parts of the crosslinking agent and 300 parts of polytetramethylene ether glycol having a number average molecular weight (Mn) of 1000 (trade name: "PTG-1000SN", manufactured by Hodogaya Chemical Co., Ltd.) were blended with 100 parts of the polyester A-6.

Example 11

A pressure-sensitive adhesive sheet (for surface protection) was obtained in the same manner as in Example 9, except that 30 parts of the crosslinking agent and 30 parts of polytetramethylene ether glycol having a number average molecular weight (Mn) of 3000 (trade name: "PTG-3000SN", manufactured by Hodogaya Chemical Co., Ltd.) were blended with 100 parts of the polyester A-6.

Example 12

A pressure-sensitive adhesive sheet (for surface protection) was obtained in the same manner as in Example 9, except that 60 parts of the crosslinking agent and 300 parts of polytetramethylene ether glycol having a number average molecular weight (Mn) of 3000 (trade name: "PTG-3000SN", manufactured by Hodogaya Chemical Co., Ltd.) were blended with 100 parts of the polyester A-6.

Example 13

A pressure-sensitive adhesive sheet (for surface protection) was obtained in the same manner as in Example 9, except that 60 parts of the crosslinking agent and 150 parts of polytetramethylene ether glycol having a number average molecular weight (Mn) of 2000 (trade name: "PTG-2000SN", manufactured by Hodogaya Chemical Co., Ltd.) were blended with 100 parts of the polyester A-6.

Example 14

A pressure-sensitive adhesive sheet (for surface protection) was obtained in the same manner as in Example 9, except that 70 parts of the crosslinking agent and 150 parts of polytrimethylene ether glycol having a number average molecular weight (Mn) of 1000 (trade name: "Cerenol H1000", manufactured by DuPont) were blended with 100 parts of the polyester A-6.

Example 15

A pressure-sensitive adhesive sheet (for surface protection) was obtained in the same manner as in Example 9, except that 40 parts of the crosslinking agent and 150 parts of polyoxypropylene glycol having a number average molecular weight (Mn) of 3200 (trade name: "Sannix PP-3000", manufactured by Sanyo Chemical Industries Ltd.) were blended with 100 parts of the polyester A-6.

Example 16

A pressure-sensitive adhesive sheet (for surface protection) was obtained in the same manner as in Example 9, except that 70 parts of the crosslinking agent and 150 parts of copolyether polyol having a number average molecular weight (Mn) of 1000 (trade name: "PTG-L1000", manufactured by Hodogaya Chemical Co., Ltd.) were blended with 100 parts of the polyester A-6.

Example 17

A pressure-sensitive adhesive sheet (for surface protection) was obtained in the same manner as in Example 9, except that 60 parts of the crosslinking agent and 150 parts of copolyether polyol having a number average molecular weight (Mn) of 2000 (trade name: "PTG-L2000", manufactured by Hodogaya Chemical Co., Ltd.) were blended with 100 parts of the polyester A-6.

Example 18

A pressure-sensitive adhesive sheet (for surface protection) was obtained in the same manner as in Example 9, except that 40 parts of the crosslinking agent and 150 parts of copolyether polyol having a number average molecular weight (Mn) of 3000 (trade name: "PTG-L3000", manufactured by Hodogaya Chemical Co., Ltd.) were blended with 100 parts of the polyester A-6.

Comparative Example 6

A pressure-sensitive adhesive sheet (applicable for surface protection) was obtained in the same manner as in Example 9, except that 20 parts of the crosslinking agent and 150 parts of polytetramethylene ether glycol having a number average molecular weight (Mn) of 3000 (trade name: "PTG-3000SN", manufactured by Hodogaya Chemical Co., Ltd.) were blended with 100 parts of the polyester A-7.

(Weight Average Molecular Weight)

The weight average molecular weight (Mw) was measured as follows: about 0.2 g of each polyester was collected on a petri dish, and the solvent was removed by drying at 120° C. for 2 hours. Then, 0.01 g of the polyester layer on the petri dish was weighed, which was added to 10 g of tetrahydrofuran (THF) and left for 24 hours for dissolution. The obtained solution was subjected to gel permeation chromatography (GPC), and the molecular weight of each polyester was measured based on the calibration curve produced using standard polystyrene.

(Measurement Conditions)

Apparatus name: HLC-8220GPC, manufactured by Tosoh Corporation

Test piece concentration: 0.1% by weight (THF solution)

Test piece injection amount: 20 μl

Fluent: THF

Flow rate: 0.300 ml/min

Measurement (column) temperature: 40° C.

Column: Test piece column; TSKguardcolumn SuperHZ-L (1 column)+TSKgel SuperHZM-M (2 columns), reference column; TSKgel SuperH-RC (1 column), manufactured by Tosoh Corporation Detector: Differential refractometer (RI)

(Number Average Molecular Weight)

The number average molecular weight (Mn) was also measured in the same manner as in the weight average molecular weight (Mw).

(Gel Fraction of Pressure-Sensitive Adhesive Layer)

Each of the pressure-sensitive adhesive sheets having a thickness of 30 μm obtained in Examples and Comparative Examples was cut in a size of 5 cm×5 cm. The support was removed from the cut pressure-sensitive adhesive sheet to obtain a test piece, and this test piece was wrapped with a Teflon (registered trade name) sheet with a known weight, and the obtained test piece was weighed and then left at 23° C. for 7 days in toluene to extract the sol component from the test piece. Thereafter, the resulting test piece was dried at 120° C. for 2 hours and then weighed. The gel fraction was calculated according to the following equation.

Gel fraction (% by weight)=(weight after drying−weight of Teflon(registered trade name)sheet)/(weight before drying−weight of Teflon(registered trade name)sheet)×100

(Adhesive Strength: Initial Period)

Each of the pressure-sensitive adhesive sheets having a pressure-sensitive adhesive layer with a thickness of 10 μm obtained in Examples and Comparative Examples was cut in 25 mm width, and the pressure-sensitive adhesive surface of the pressure-sensitive adhesive sheet was bonded to a tin-untreated surface of alkali glass (manufactured by Matsunami Glass Ind., Ltd.) to obtain each test piece, and the adhesive strength to the alkali glass (N/25 mm) was measured. The pressure bonding at the time of bonding was carried out by reciprocating a 2 kg roller one time, and the measurement of adhering strength (adhesive strength) at 180° peeling was carried out using a tensile compression tester (apparatus name: "TG-1 kN", manufactured by Minebea Co., Ltd.) in the following conditions.

Tension (peeling) rate: 300 mm/min

Measurement conditions: temperature: 23±2° C., humidity 65±5% RH (Adhesive Strength: Over Time)

Each test piece prepared in the same manner as in the initial period evaluation was preserved in an atmosphere of a temperature of 60° C. and a humidity of 90% for 3 days, and thereafter left still at room temperature for 1 hour or more, and then, the adhering strength measurement was carried out in the same manner as in the initial period evaluation.

The adhesive strength (initial period) and the adhesive strength (over time) are both preferably 1.0 N/25 mm or less, more preferably 0.9 N/25 mm or less, and particularly preferably 0.8 N/25 mm or less. If the adhesive strength exceeds 1.0 N/25 mm, the adhesive strength is too high so that light peelability (removability) cannot be attained, and for example, in the case of using the test piece as a pressure-sensitive adhesive sheet for surface protection, adhesive residues may remain on an adherend at the time of peeling thereafter, and the support (substrate) may be damaged, and therefore it is not preferable.

(Anti-Staining Property)

Presence or absence of staining on an adherend was evaluated in accordance with presence or absence of traces of bleeding out or presence or absence of adhesive residues by observing, with naked eyes, the surface of the adherend which had contact with pressure-sensitive adhesive layer after the measurement of the adhesive strength.

(Wettability)

Each of the pressure-sensitive adhesive sheets obtained in Examples and Comparative Examples was cut in 25 mm width and 70 mm length, and the pressure-sensitive adhesive surface was dropped calmly onto a glass plate, and the motion-pictures of widening of the surface area of the pressure-sensitive adhesive surface per one second were taken by a video camera. The color shades owing to wetting were then binarized for every 0.5 seconds so that the wet surface area was measured, and the wetting rate (cm²/s) was calculated for evaluation. Presence or absence of inclusion of air bubbles was also observed together with the evaluation of wettability.

The wetting rate of the pressure-sensitive adhesive sheet of the present invention is preferably 1.8 cm²/s or more, more preferably 2.0 cm²/s or more, and particularly preferably 3.0 cm²/s. If the wetting rate is less than 1.8 cm²/s, handleability may be inferior and air bubbles may be easily included, and the appearance of the adherend to which a surface protective sheet is bonded is worsened, and therefore it is not preferable.

TABLE 1

| Blending contents and evaluation results | | | Example | | | | | | | |
|---|---|---|---|---|---|---|---|---|---|---|
| | | | 1 | 2 | 3 | 4 | 5 | 6 | 7 | |
| Polyester | A-1 | Mw: 55000 | | | | | | | | |
| | A-2 | Mw: 23000 | | 100 | 100 | | 100 | | | |
| | A-3 | Mw: 9000 | 100 | | | | | 100 | | |
| | A-4 | Mw: 4000 | | | | | | | | |
| | A-5 | Mw: 24000 | | | | 100 | | | 100 | |
| Polyether polyol | B-1 | Mn: 400 | | 25 | | | | | | |
| | B-2 | Mn: 2000 | | | | | | | 30 | |
| | B-3 | Mn: 439 | 25 | | | | 15 | | | |
| | B-4 | Mn: 800 | | | | | | 25 | | |
| | B-5 | Mn: 1900 | | | | | | | | |
| | B-6 | Mn: 500 | | | | 25 | | | | |
| | B-7 | Mn: 400 | | | | | 25 | | | |
| Crosslinking agent | C-1 | | 20 | 15 | 20 | 20 | 25 | 20 | | |
| | C-2 | | | | | | | | 15 | |
| | C-3 | | | | | | | | 5 | |
| Gel fraction | | % by weight | 69 | 61 | 75 | 64 | 81 | 70 | 94 | |
| Adhesive strength | Initial period | N/25 mm | 0.05 | 0.12 | 0.17 | 0.04 | 0.60 | 0.06 | 0.07 | |
| Adhesive strength | Over time | N/25 mm | 0.06 | 0.28 | 0.21 | 0.20 | 0.30 | 0.35 | 0.12 | |
| Presence or absence of staining | | — | Absence | Absence | Absence | Absence | Absence | Absence | Absence | |
| Wetting rate | | cm²/sec | 6.2 | 5.2 | 4.8 | 8.2 | 5.2 | 5.8 | 7.2 | |
| Determination (applicable for surface protection) | | | ○ | ○ | ○ | ○ | ○ | ○ | ○ | |

| Blending contents and evaluation results | | | Example | Comparative Example | | | | |
|---|---|---|---|---|---|---|---|---|
| | | | 8 | 1 | 2 | 3 | 4 | 5 |
| Polyester | A-1 | Mw: 55000 | | | | | 100 | |
| | A-2 | Mw: 23000 | | 100 | 100 | | | |
| | A-3 | Mw: 9000 | | | | 100 | | |
| | A-4 | Mw: 4000 | | | | | | 100 |
| | A-5 | Mw: 24000 | 100 | | | | | |
| Polyether polyol | B-1 | Mn: 400 | 6 | | | | | |
| | B-2 | Mn: 2000 | | | | | | |
| | B-3 | Mn: 439 | | | 40 | | 25 | 20 |
| | B-4 | Mn: 800 | | | | | | |
| | B-5 | Mn: 1900 | | | | 25 | | |
| | B-6 | Mn: 500 | | | | | | |
| | B-7 | Mn: 400 | | | | | | |
| Crosslinking agent | C-1 | | | 10 | 20 | 20 | 15 | 30 |
| | C-2 | | 9 | | | | | |
| | C-3 | | 6 | | | | | |
| Gel fraction | | % by weight | 91 | 90 | 23 | 78 | 62 | 97 |
| Adhesive strength | Initial period | N/25 mm | 0.16 | 1.20 | 0.03 | 0.001 | 2.40 | 0.02 |
| Adhesive strength | Over time | N/25 mm | 0.75 | 3.50 | 0.02 | 0.005 | 4.50 | 0.03 |
| Presence or absence of staining | | — | Absence | Absence | Presence | Presence | Absence | Absence |
| Wetting rate | | cm²/sec | 6.8 | 5.1 | 9.6 | 10.2 | 5.8 | 1.6 |
| Determination (applicable for surface protection) | | | ○ | x | x | x | x | x |

TABLE 2

| Blending contents and evaluation results | | | Example 9 | 10 | 11 | 12 | 13 | 14 | 15 |
|---|---|---|---|---|---|---|---|---|---|
| Polyester | A-6 | Mw: 10000 | 100 | 100 | 100 | 100 | 100 | 100 | 100 |
|  | A-7 | Mw: 70000 |  |  |  |  |  |  |  |
| Polyether polyol | B-8 | Mn: 1000 | 30 | 300 |  |  |  |  |  |
|  | B-9 | Mn: 3000 |  |  | 30 | 300 |  |  |  |
|  | B-10 | Mn: 2000 |  |  |  |  | 150 |  |  |
|  | B-11 | Mn: 1000 |  |  |  |  |  | 150 |  |
|  | B-12 | Mn: 3200 |  |  |  |  |  |  | 150 |
|  | B-13 | Mn: 1000 |  |  |  |  |  |  |  |
|  | B-14 | Mn: 2000 |  |  |  |  |  |  |  |
|  | B-15 | Mn: 3000 |  |  |  |  |  |  |  |
| Crosslinking agent | C-4 | | 50 | 100 | 30 | 60 | 60 | 70 | 40 |
| Gel fraction | | % by weight | 95 | 98 | 97 | 98 | 96 | 98 | 97 |
| Adhesive strength | Initial period | N/25 mm | 0.10 | 0.10 | 0.10 | 0.10 | 0.10 | 0.10 | 0.10 |
| Presence or absence of staining | | — | Absence | Absence | Absence | Absence | Absence | Absence | Absence |
| Wetting rate | | cm$^2$/sec | 7.6 | 8.2 | 8.1 | 8.5 | 7.9 | 7.8 | 7.6 |
| Inclusion of air bubbles | | — | Absence | Absence | Absence | Absence | Absence | Absence | Absence |

| Blending contents and evaluation results | | | Example 16 | 17 | 18 | Comparative Example 6 |
|---|---|---|---|---|---|---|
| Polyester | A-6 | Mw: 10000 | 100 | 100 | 100 |  |
|  | A-7 | Mw: 70000 |  |  |  | 100 |
| Polyether polyol | B-8 | Mn: 1000 |  |  |  |  |
|  | B-9 | Mn: 3000 |  |  |  | 150 |
|  | B-10 | Mn: 2000 |  |  |  |  |
|  | B-11 | Mn: 1000 |  |  |  |  |
|  | B-12 | Mn: 3200 |  |  |  |  |
|  | B-13 | Mn: 1000 | 150 |  |  |  |
|  | B-14 | Mn: 2000 |  | 150 |  |  |
|  | B-15 | Mn: 3000 |  |  | 150 |  |
| Crosslinking agent | C-4 | | 70 | 60 | 40 | 20 |
| Gel fraction | | % by weight | 97 | 98 | 98 | 80 |
| Adhesive strength | Initial period | N/25 mm | 0.10 | 0.10 | 0.10 | 1.50 |
| Presence or absence of staining | | — | Absence | Absence | Absence | Absence |
| Wetting rate | | cm$^2$/sec | 8 | 8.2 | 8.3 | 2.5 |
| Inclusion of air bubbles | | — | Absence | Absence | Absence | Presence |

From the results of evaluation in Table 1, regarding Examples 1 to 8, since desirable polyesters and polyether polyols were used, pressure-sensitive adhesive layers (pressure-sensitive adhesive sheets) were obtained which had desired gel fraction and adhesive strength (peel strength), had good wettability at the time of bonding to an adherend and excellent workability, had no adhesive residues even after being peeled off, and had excellent light peelability (removability), preventing properties for increasing adhesive strength, anti-staining properties and workability. It was confirmed that in the pressure-sensitive adhesive layers (pressure-sensitive adhesive sheets), a wide range of pressure-sensitive adhesion design is possible. Particularly, it was confirmed that a pressure-sensitive adhesive sheet suitable for surface protection could be obtained. In Examples 9 to 18, it was also confirmed that inclusion of air bubbles did not occur. In Examples 10 to 18, specified polyether polyols were used, and therefore inclusion of air bubbles was not observed and the pressure-sensitive adhesive layers were useful.

On the other hand, in Comparative Example 1, because a polyether polyol was not used, not only the adhesive strength in initial period but also the adhesive strength over time were high, and it was confirmed that light peelability (removability) and preventing properties for increasing adhesive strength were inferior. In Comparative Example 2, the blending amount of the polyether polyol was large, gelation did not proceed as expected, the gel fraction of the pressure-sensitive adhesive layer was significantly low, and staining was observed. Further, in Comparative Example 3, the weight average molecular weight of the polyester polyol was high and staining was observed. In Comparative Example 4, because the polyether polyol having a weight average molecular weight exceeding the desired range was used, not only the adhesive strength in initial period but also the adhesive strength over time was high, and it was confirmed that light peelability (removability) and preventing properties for increasing adhesive strength were inferior. In Comparative Example 5, because the polyester having a weight average molecular weight less than the desired range was used, it was confirmed that the gel fraction was increased, the wetting rate was very slow, and workability was inferior. In Comparative Example 6, because the polyester having a weight average molecular weight exceeding the desirable range was used, the adhesive strength in initial period was too high and inclusion of air bubbles was also confirmed.

The invention claimed is:

1. A polyester-based pressure-sensitive adhesive composition comprising a polyester, a polyether polyol, and a crosslinking agent, wherein the polyester is obtained by condensation polymerization of at least a dicarboxylic acid having a side chain and a diol, and the polyester does not contain a lactic acid unit, the polyester has a weight average molecular weight of 5000 to 50000, the polyether polyol contains a polyether polyol having hydroxyl groups at only part of the terminals and/or all terminals, the polyether polyol having hydroxyl groups at only part of the terminals has a number average molecular weight of 100 to 1500, and the polyether polyol having hydroxyl groups at only part of the terminals is contained in an amount of 1 to 35 parts by weight based on 100 parts by weight of the polyester.

2. The polyester-based pressure-sensitive adhesive composition according to claim 1, wherein the polyether polyol having hydroxyl groups at all terminals has a number average molecular weight of 100 to 5000, and the polyether polyol having hydroxyl groups at all terminals is contained in an amount of 1 to 400 parts by weight based on 100 parts by weight of the polyester.

3. The polyester-based pressure-sensitive adhesive composition according to claim 1, wherein the dicarboxylic acid and the diol are present in a mole ratio of 1:(1.08 to 2.10).

4. The polyester-based pressure-sensitive adhesive composition according to claim 1, wherein the side chain of the dicarboxylic acid is an alkyl group.

5. A pressure-sensitive adhesive sheet comprising a support and a pressure-sensitive adhesive layer obtained by crosslinking the polyester-based pressure-sensitive adhesive composition according to claim 1 and formed on at least one surface of the support.

6. The pressure-sensitive adhesive sheet according to claim 5, wherein the pressure-sensitive adhesive layer has a gel fraction of 40 to 95% by weight.

7. The pressure-sensitive adhesive sheet according to claim 5, which has an adhesive strength to glass of 1.0 N/25 mm or less.

8. The pressure-sensitive adhesive sheet according to claim 5, which is used for surface protection.

* * * * *